US006182632B1

(12) United States Patent
Yanagihara

(10) Patent No.: US 6,182,632 B1
(45) Date of Patent: Feb. 6, 2001

(54) COMPRESSION-IGNITION TYPE ENGINE

(75) Inventor: Hiromichi Yanagihara, Gotemba (JP)

(73) Assignee: Toyota Jidosha Kabushiki Kaisha, Toyota (JP)

(*) Notice: Under 35 U.S.C. 154(b), the term of this patent shall be extended for 0 days.

(21) Appl. No.: 09/096,340

(22) Filed: Jun. 12, 1998

(30) Foreign Application Priority Data

Jun. 18, 1997 (JP) .................................................. 9-161465
Feb. 20, 1998 (JP) ................................................ 10-039146

(51) Int. Cl.$^7$ ........................................................ F02B 3/06
(52) U.S. Cl. ............................................................ 123/299
(58) Field of Search ................................. 123/299, 300, 123/305

(56) References Cited

U.S. PATENT DOCUMENTS

| 4,704,999 | | 11/1987 | Hashikawa et al. | 123/299 |
|---|---|---|---|---|
| 4,836,161 | | 6/1989 | Abthoff et al. | 123/299 |
| 5,078,107 | * | 1/1992 | Morikawa | 123/299 |
| 5,170,759 | * | 12/1992 | Ito | 123/299 |
| 5,271,362 | * | 12/1993 | Kobayashi et al. | 123/299 |
| 5,313,920 | * | 5/1994 | Matsushita | 123/300 |
| 5,331,933 | * | 7/1994 | Matsushita | 123/300 |
| 5,467,757 | | 11/1995 | Yanagihara et al. | 123/305 |
| 5,727,519 | | 3/1998 | Kawamura | 123/262 |
| 5,732,674 | | 3/1998 | Motoyama et al. | 123/299 |
| 5,740,776 | * | 4/1998 | Enderle et al. | 123/299 |
| 5,743,243 | * | 4/1998 | Yanagihara | 123/305 |
| 5,839,275 | * | 11/1998 | Hirota et al. | 123/300 |
| 5,865,153 | | 2/1999 | Matsumoto | 123/299 |

FOREIGN PATENT DOCUMENTS 37 34 800   5/1989  (DE) .
6-129296   5/1994  (JP) .
8-82219   3/1996  (JP) .

OTHER PUBLICATIONS

H. Yokota et al., SAE 970891, *A New Concept for Low Emission Diesel Combustion*, Apr. 7, 1997, pp. 109–119.
K. Nakagome et al., SAE 970898, *Combustion and Emission Characterstics of Premixed Lean Diesel Combustion Engine*, Apr. 7, 1997, pp. 163–171.
H. Yanagihara, No. 96–0418, *Transactions of the Japan Society of Mechanical Engineers*, Feb. 1997, pp. 368–373.
H. Yanagihara, *Simultaneous Reduction of $NO_x$ and Soot in Diesel Engines Using a New Mixture Preparation Method*, Series B, vol. 40, No. 4, 1997, pp. 592–598.
H. Yanagihara et al., *A study of DI diesel combustion under uniform higher–dispersed mixture formation*, JSAE Review, vol. 18, No. 3, Jul. 1997, pp. 247–254.
Klein, H. et al., "Einfluss Der Kraftstoff –Voreinsprintzung Auf Das Betriebsverhalten Von Mittelschnellaufenden Dieselmotoren", MTZ Motortechnische Zeitschrift, vol. 53, No. 9, Sep. 1, 1992, pp. 408–410, 412–41, XP000296356 * p. 410–p. 414*.

* cited by examiner

Primary Examiner—Willis R. Wolfe
Assistant Examiner—Hieu T. Vo.
(74) Attorney, Agent, or Firm—Oliff & Berridge, PLC

(57) ABSTRACT

A compression-ignition type engine in which first fuel of an amount of not more than 30 percent of the maximum amount of fuel is injected in an injection timing region from about 90 degrees to about 20 degrees before top dead center of the compression stroke so that the injected fuel does not break up due to heat or burn until the top dead center of the compression stroke is substantially reached but undergoes an oxidation reaction. Next, second fuel is injected at substantially the top dead center of the compression stroke to start the combustion of the injected fuel.

18 Claims, 7 Drawing Sheets

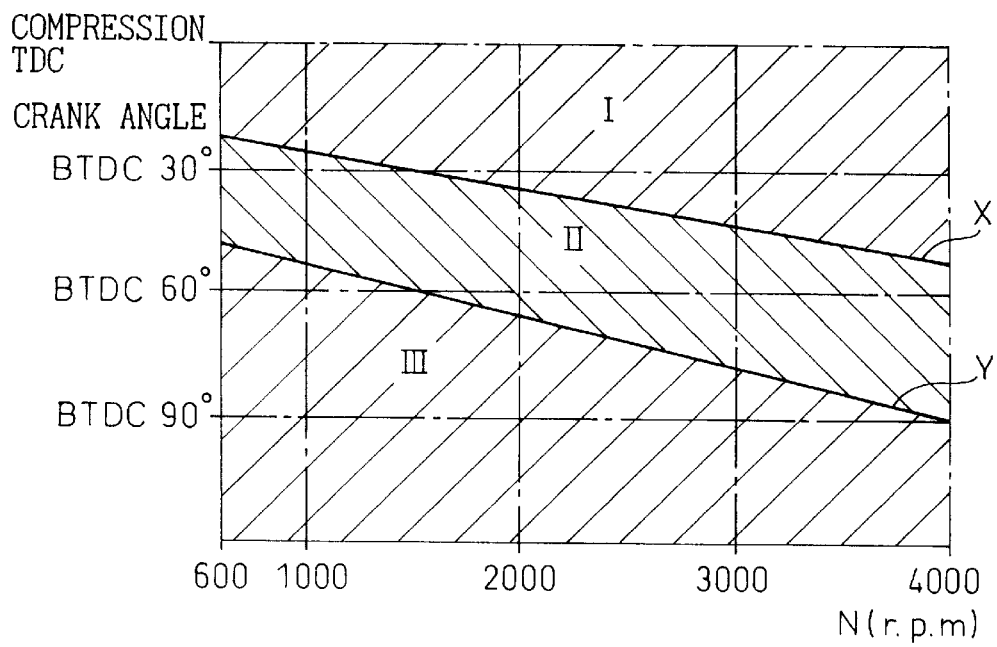
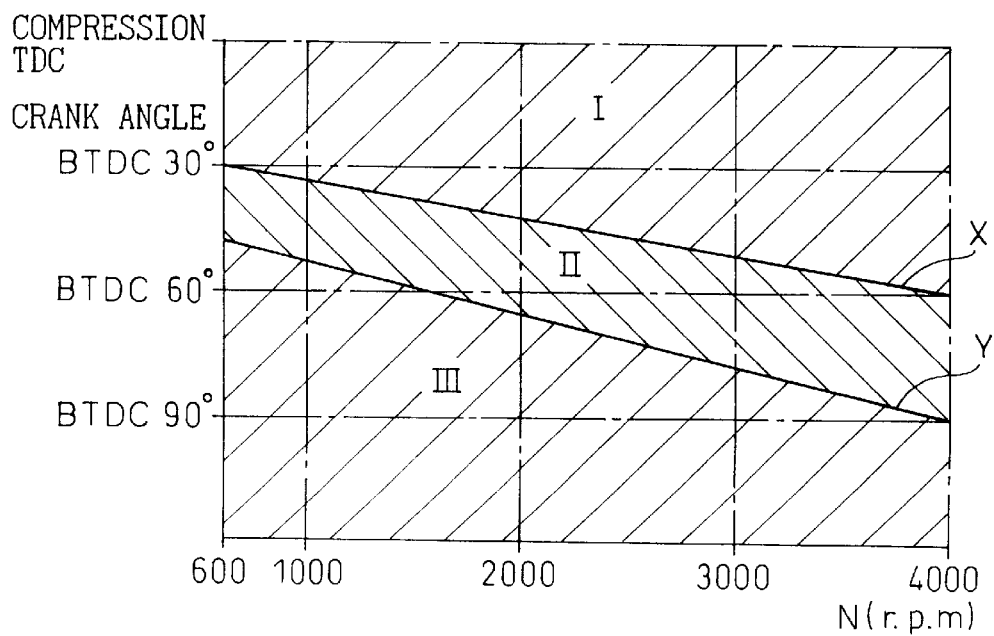

Fig. 7A $$\begin{array}{c|cccc} L & Q_{11} & Q_{12} & \cdots\cdots & Q_{1n} \\ & Q_{21} & & & \vdots \\ & \vdots & & & \vdots \\ & Q_{m1} & \cdots\cdots\cdots & & Q_{mn} \\ \hline & & & & N \end{array}$$

Fig. 7B $$\begin{array}{c|cccc} Q & Q1_{11} & Q1_{12} & \cdots\cdots & Q1_{1n} \\ & Q1_{21} & & & \vdots \\ & \vdots & & & \vdots \\ & Q1_{m1} & \cdots\cdots\cdots & & Q1_{mn} \\ \hline & & & & N \end{array}$$

Fig. 7C $$\begin{array}{c|cccc} Q & \theta S1_{11} & \theta S1_{12} & \cdots\cdots & \theta S1_{1n} \\ & \theta S1_{21} & & & \vdots \\ & \vdots & & & \vdots \\ & \theta S1_{m1} & \cdots\cdots\cdots & & \theta S1_{mn} \\ \hline & & & & N \end{array}$$

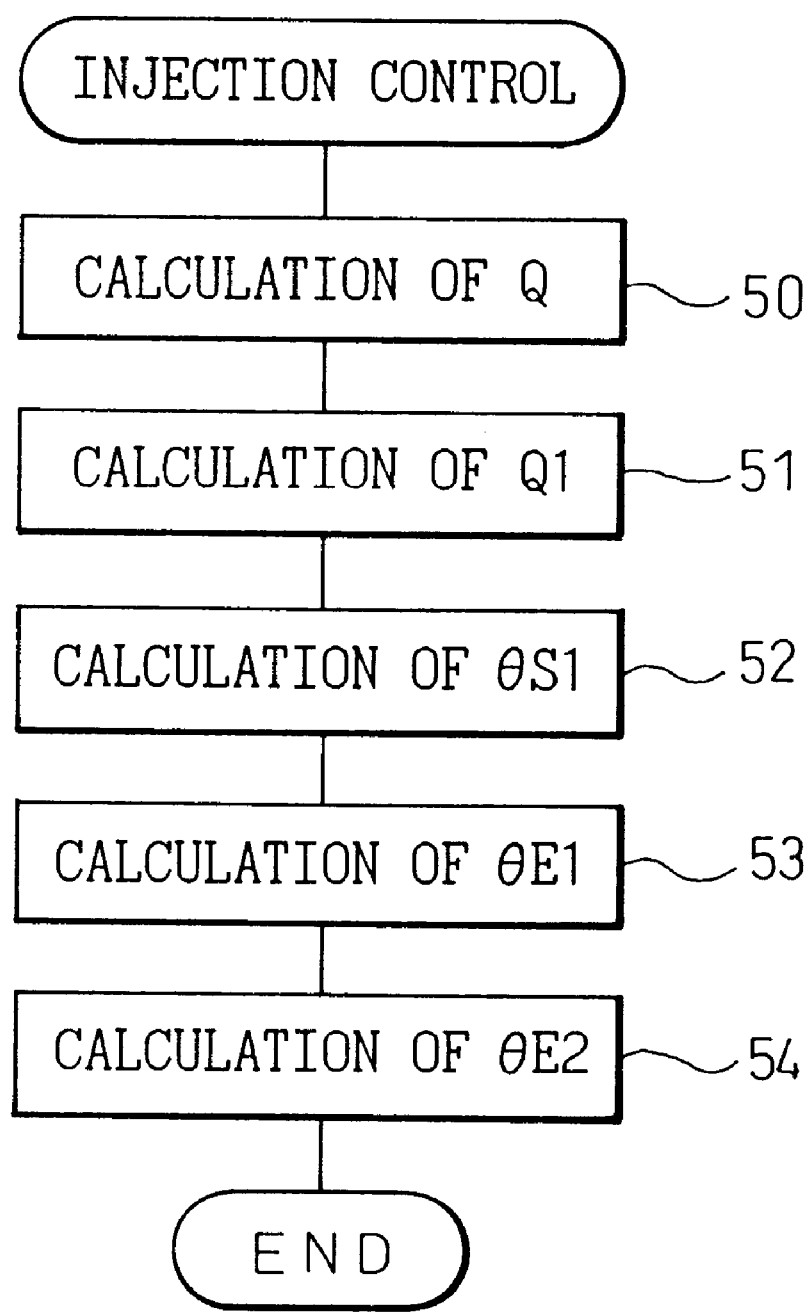

US 6,182,632 B1

COMPRESSION-IGNITION TYPE ENGINE

BACKGROUND OF THE INVENTION

1. Field of the Invention

The present invention relates to a compression-ignition type engine.

2. Description of the Related Art

In a compression-ignition type engine, the degree of dispersion of the fuel injected into the combustion chamber has a major effect on the combustion. That is, if the fuel is made to disperse throughout the combustion chamber, the amount of heat generated per unit volume becomes lower, so the combustion temperature becomes lower and therefore smooth combustion is achieved without the generation of NOx. Further, since there is sufficient air present around the fuel particles, soot is no longer generated either. Therefore, known in the art is a compression-ignition type engine which is designed to inject fuel during the compression stroke before 60 degrees before top dead center (see Japanese Unexamined Patent Publication (Kokai) No. 7-317588).

That is, if the pressure in the combustion chamber becomes high, the air resistance becomes larger, so the injected fuel has difficulty spreading throughout the entire combustion chamber. Therefore, this compression-ignition type engine was designed to inject the fuel before 60 degrees before top dead center in the compression stroke where the pressure in the combustion chamber is low.

When causing the injected fuel to disperse throughout the combustion chamber in this way, smooth combustion is achieved without the generation of NOx or hydrocarbons if the amount of injected fuel is small. When the amount of fuel injected becomes larger, however, even if trying to cause the injected fuel to disperse throughout the combustion chamber, the fuel starts igniting early. Once the fuel ignites early, the temperature in the combustion chamber rises, so the fuel ignites even earlier. As a result, the combustion gradually becomes more intense and not only will knocking occur, but also large amounts of NOx and soot will be produced.

In this way, in the above compression-ignition type engine, the ignition timing can no longer be controlled to the ignition timing giving a smooth combustion when the amount of injected fuel becomes large. If it were possible to control the ignition timing to the ignition timing giving smooth combustion in this case, then it would be possible to achieve smooth combustion with little generation of NOx and soot.

SUMMARY OF THE INVENTION

An object of the present invention is to provide a compression-ignition type engine which is capable of controlling the ignition timing to an ignition timing giving a smooth combustion.

According to the present invention, there is provided a compression-ignition type engine comprising a combustion chamber; a fuel injector injecting fuel toward the inside of the combustion chamber; and injection control means for injecting an amount of first fuel by which amount combustion does not occur even if injected, in a predetermined injection timing region of a latter half of a compression stroke where combustion does not occur even if injected, and causing injection of second fuel at a timing later than the predetermined injection timing region to cause combustion of the first fuel and the second fuel.

BRIEF DESCRIPTION OF THE DRAWINGS

The present invention may be more fully understood from the description of the preferred embodiments of the invention set forth below together with the accompanying drawings, in which:

FIGS. 2A and 2B and FIGS. 3A and 3B are view of different injection timing regions;

FIGS. 7A to 7C are maps of the total amount of fuel injection Q etc.; and

FIG. 8 is a flow chart of the injection control.

DESCRIPTION OF THE PREFERRED EMBODIMENTS

Figure 1:
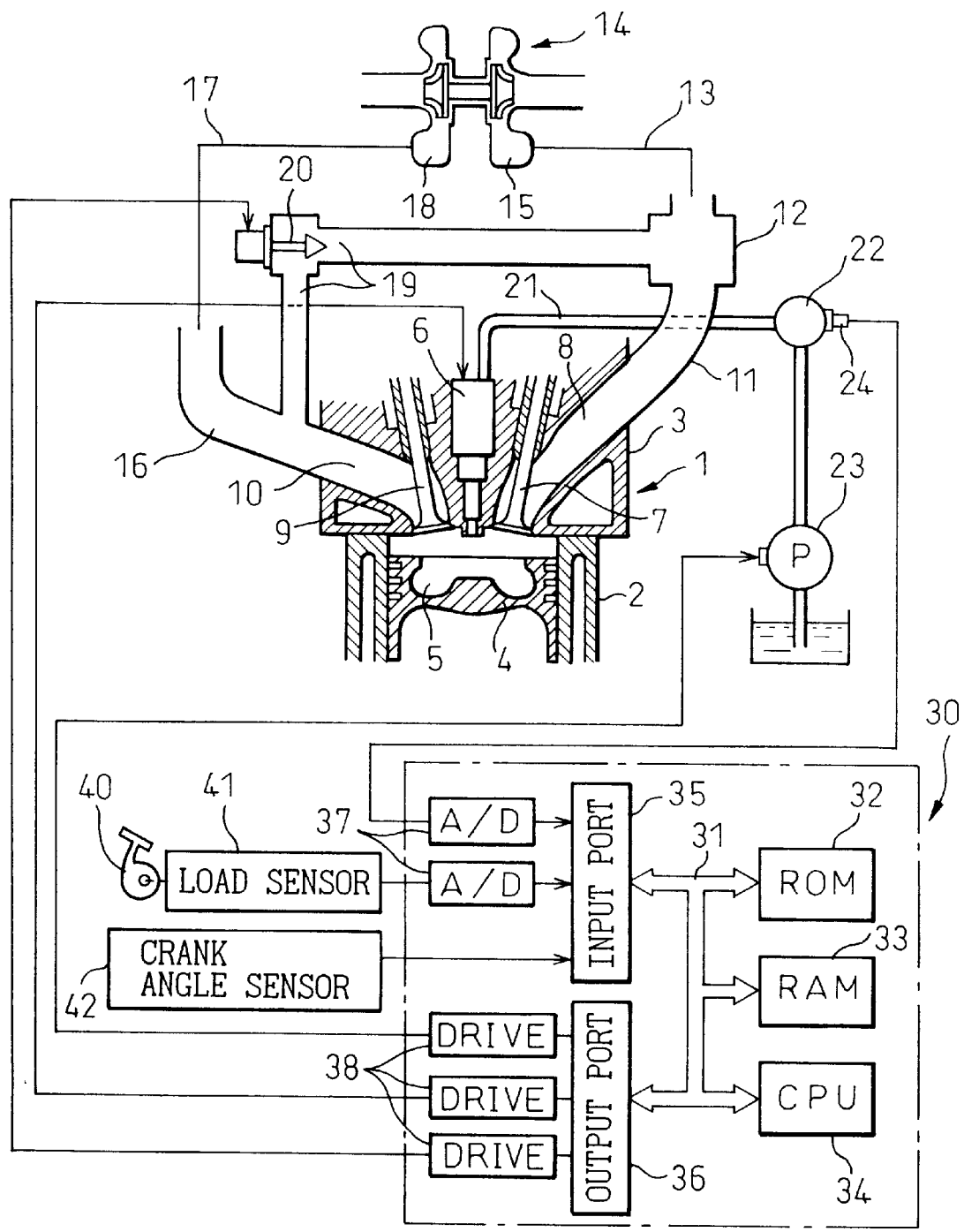
FIG. 1 is an overall view of a compression-ignition type engine.

Referring to FIG. 1, 1 designates an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake pipe 11 to a surge tank 12. The surge tank 12 is connected to a compressor 15 of an exhaust turbocharger 14 through an intake duct 13. On the other hand, the exhaust port 10 is connected through an exhaust manifold 16 and exhaust pipe 17 to an exhaust turbine 18 of an exhaust turbocharger 14.

The exhaust manifold 16 and surge tank 12 are connected with each other through an exhaust gas recirculation (hereinafter referred to as "EGR") passage 19. In the EGR passage 19 is disposed an electrically controlled EGR control valve 20. The fuel injectors 6 are connected through fuel supply pipes 21 to a fuel reservoir, that is, a so-called common rail 22. The common rail 22 is supplied with fuel from an electrically controlled variable discharge fuel pump 23. The fuel supplied in the common rail 22 is supplied through the fuel supply pipes 21 to the fuel injectors 6. The common rail 22 is provided with a fuel pressure sensor 24 for detecting the fuel pressure in the common rail 22. The output signal of the fuel pressure sensor 25 is used to control the discharge of the fuel pump 23 so that the fuel pressure in the common rail 22 becomes the target fuel pressure.

An electronic control unit 30 is comprised of a digital computer and is provided with a read only memory (ROM) 32, random access memory (RAM) 33, microprocessor (CPU) 34, input port 35, and output port 36 connected to each other through a bidirectional bus 31. The output signal of the fuel pressure sensor 24 is input through a corresponding AD converter 37 to the input port 35. An accelerator pedal 40 has connected to it a load sensor 41 for generating an output voltage proportional to the amount of depression L of the accelerator pedal 40. The output voltage of the load sensor 41 is input through an corresponding AD converter 37 to the input port 35. Further, the input port 35 has connected to it a crank angle sensor 42 which generates an output pulse with each for example 30 degree revolution of the crankshaft. On the other hand, the output port 36 is connected through a corresponding drive circuit 38 to the fuel injectors 6, EGR control valve 20, and fuel pump 23.

In the embodiment shown in FIG. 1, to get the injected fuel to be dispersed as uniformly as possible in the combustion chamber 5, the fuel injector 6 is comprised of a nozzle having a large number of nozzle openings. When using such a fuel injector 6 to make the injected fuel disperse in the combustion chamber 5, it was learned that depending on the amount of injection and the injection timing, there were cases where the injected fuel would burn and cases where the injected fuel would not burn. Therefore, first, this will be explained with reference to FIGS. 2A and 2B and FIGS. 3A and 3B.

Figure 3A:
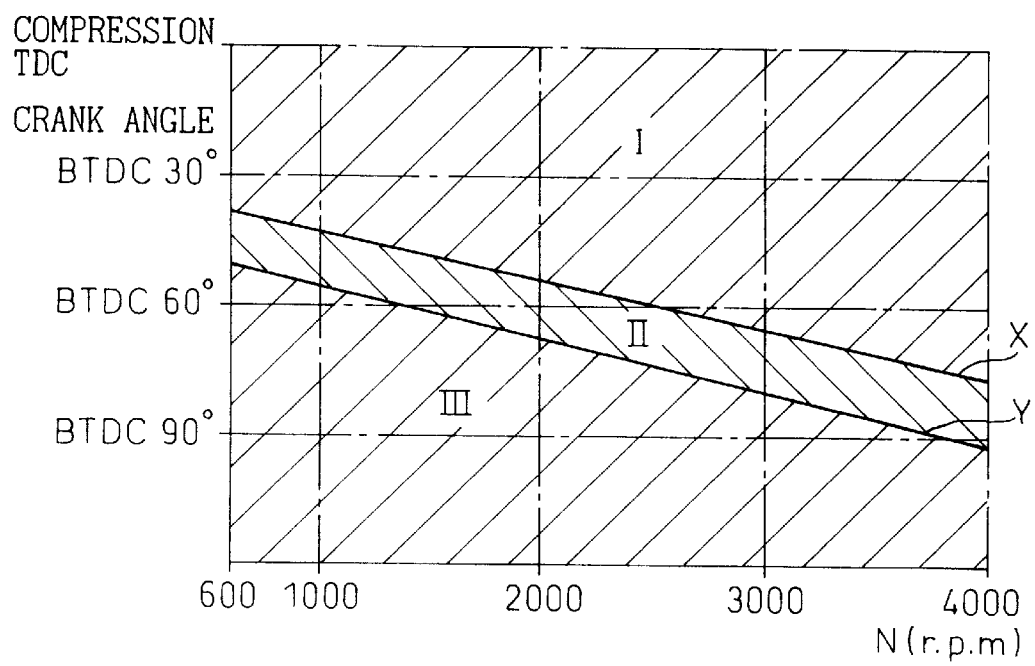
Figure 3B:
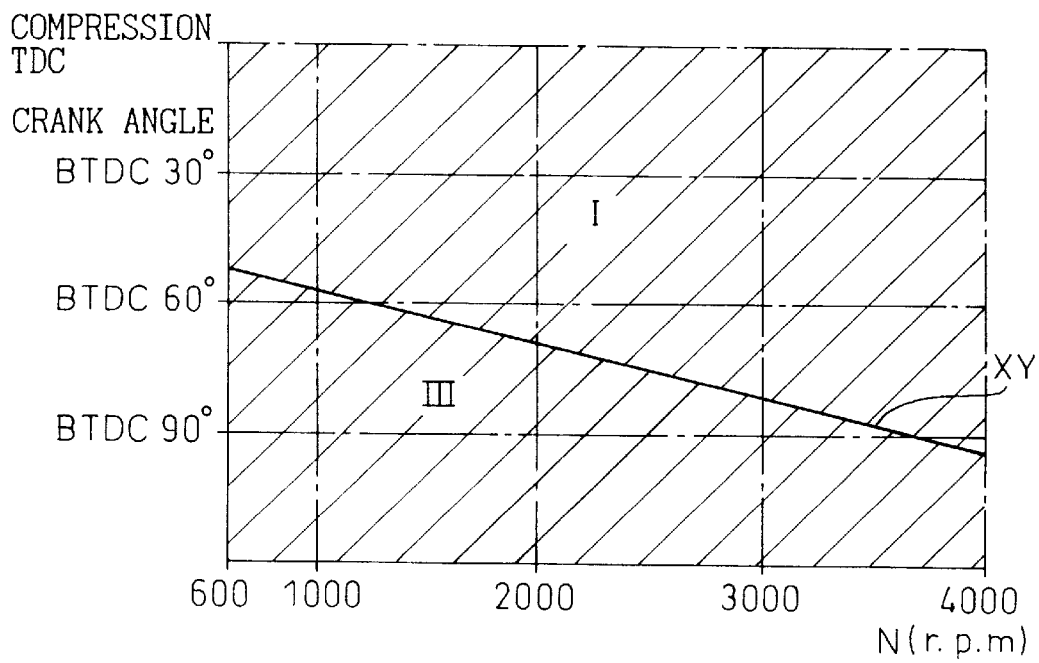

In FIGS. 2A and 2B and FIGS. 3A and 3B, the ordinate indicates the crank angle, while the abscissa indicates the engine speed N. Further, FIG. 2A shows the case of injection of fuel in an amount of 5 percent of the maximum amount of injection, FIG. 2B shows the case of injection of fuel in an amount of 10 percent of the maximum amount of injection, FIG. 3A shows the case of injection of fuel in an amount of 20 percent of the maximum amount of injection, and FIG. 3B shows the case of injection of fuel in an amount of over 30 percent of the maximum amount of injection.

Further, in FIGS. 2A and 2B and FIGS. 3A and 3B, I indicates an injection timing region where normal combustion occurs as in the past when fuel is injected at an injection timing in the region, II shows an injection timing region where no combustion occurs when fuel is injected at an injection timing in the region, and III shows an injection timing region where almost no NOx or soot is generated when fuel is injected at an injection timing in the region.

Whether or not the injected fuel burns depends on the density of the fuel particles and the temperature of the fuel particles. Simply speaking, when the density of the fuel particles is relatively low, combustion occurs if the temperature of the fuel particles is high and does not occur if the temperature of the fuel particles is low. As opposed to this, when the density of the fuel particles is high, combustion occurs regardless of the temperature of the fuel particles.

In this way, combustion occurs regardless of the temperature of the fuel particles if the density of the fuel particles is high, but the combustion at that time is explosive and generates a large amount of NOx and a large amount of soot. That is, the injected fuel undergoes a chemical reaction when the temperature in the combustion chamber 5 is more than 700° K. Before about 30 degrees BTDC, the temperature in the combustion chamber 5 is less than 700° K., therefore if the fuel is injected before 30 degrees BTDC, the injected fuel disperses in the combustion chamber 5 without undergoing a chemical reaction. Next, when the piston 4 rises and the temperature in the combustion chamber 5 becomes higher than a certain temperature, the evaporated fuel around the fuel particles bonds with oxygen. Explaining this in more detail, the terminal carbons of the straight chain hydrocarbons are attacked by the oxygen radicals resulting in the formation of aldehyde groups at the terminals of the straight chain hydrocarbons, then the aldehyde groups become hydroxy groups.

If the fuel particles become close together at this time, that is, when the density of the fuel particles is high, the fuel particles receive the heat of oxidation of the evaporated fuel of the surrounding fuel particles and become high in temperature. As a result, the hydrocarbons in the fuel particles are broken down into hydrogen molecules $H_2$ and carbon C. The hydrogen molecules $H_2$ produced by this thermal decomposition explosively burn and generate a high temperature, therefore NOx is produced. On the other hand, when carbon C is produced by the thermal decomposition, the carbon atoms bond with each other and part is discharged as soot. In this way, when the density of the fuel particles is high, even if the fuel particles can be dispersed in the combustion chamber 5 without undergoing a chemical reaction, NOx and soot are produced due to the thermal decomposition of the hydrocarbons in the fuel particles.

On the other hand, if the fuel is injected after about 30 degrees BTDC, the injected fuel immediately undergoes a chemical reaction and the hydrocarbons in the fuel particles are broken down by the heat. As a result, NOx and soot are produced. That is, when the density of the fuel particles is high, in other words, when there is a large amount of fuel injected, NOx and soot are produced no matter when the fuel is injected.

As opposed to this, when the density of the fuel particles is low, the situation is completely different. Therefore, next, an explanation will be given of the combustion when the density of the fuel particles is low, that is, when the amount of fuel injection is less than 30 percent of the maximum amount of injection and the fuel particles are made to disperse, that is, the case where fuel is injected in the injection timing region III of FIGS. 2A, 2B, 3A, and 3B.

Figure 4:
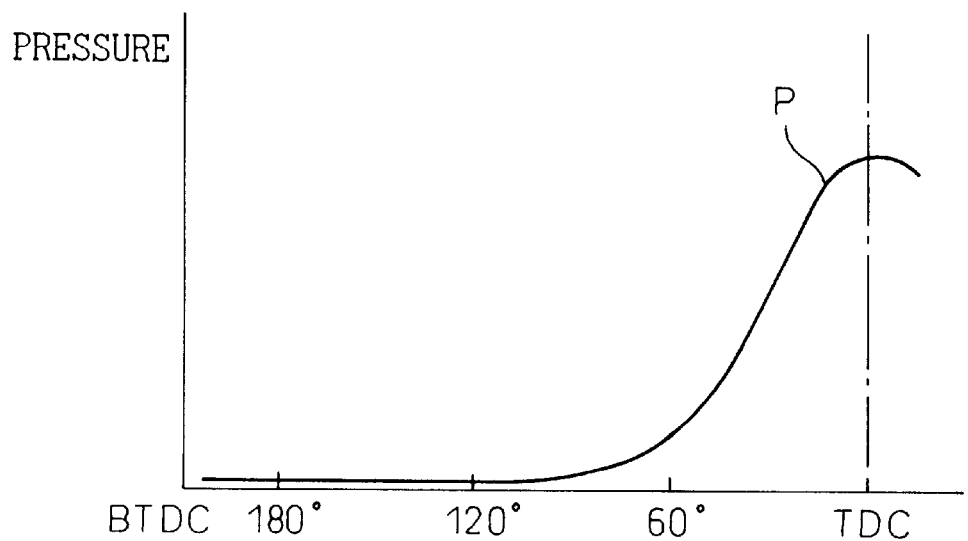
FIG. 4 is a view of the changes in pressure in the combustion chamber.

The curve of FIG. 4 shows the change in the pressure P in the combustion chamber 5 due to just the compression action of the piston 4. As will be understood from FIG. 4, the pressure P in the combustion chamber 5 rises rapidly when about 60 degrees BTDC is exceeded. This is regardless of the timing of opening of the intake valve 7. The pressure P in the combustion chamber 5 changes as shown in FIG. 4 in all types of reciprocating internal combustion engines. If the pressure P in the combustion chamber 5 becomes high, the air resistance becomes great, so the injected fuel will not disperse over a wide range. To get the injected fuel to disperse over a wide range, it is necessary to inject the fuel when the pressure P in the combustion chamber 5 is low.

As shown in FIGS. 2A, 2B, 3A, and 3B, the injection timing region III is about 50 degrees BTDC. Therefore, if fuel is injected in the injection timing region III, the fuel particles disperse over a wide range. Further, since the amount of fuel injected is less than 30 percent of the maximum amount of injection, the density of the fuel particles in the combustion chamber becomes considerably low.

If the density of the fuel particles is low in this way, the space between fuel particles becomes larger. Therefore, when the evaporated fuel around the fuel particles bond with oxygen, the fuel particles do not receive much of the heat of oxidation of the evaporated fuel of the surrounding fuel particles and therefore the fuel particles do not break down under heat. As a result, almost no hydrogen molecules $H_2$ or carbon C are produced. Next, when the compression stroke continues and the temperature of the fuel particles becomes higher, the evaporated fuel of the fuel particles substantially simultaneously start to burn.

If the evaporated fuel of the fuel particles substantially simultaneously start to burn in this way, there will not be any local high temperatures. Further, since the fuel particles are dispersed, the amount of heat generated per unit volume falls. As a result, the combustion temperature falls as a whole and therefore smooth combustion without generation of NOx is obtained. Further, since there is sufficient air present around the fuel particles, soot is no longer be produced either.

As explained above, FIGS. 2A, 2B, and 3A show cases where the amounts of fuel injected are 5 percent, 10 percent, and 20 percent of the maximum amount of fuel injection. If fuel is injected in the injection timing region III at this time, smooth combustion without generation of NOx or soot is obtained. Further, FIG. 3B shows the case where the amount of fuel injected is over 30 percent of the maximum amount of fuel injection. If fuel is injected in the injection timing region III, smooth combustion without generation of NOx and soot can be obtained up to an amount of fuel injection of about 50 percent of the maximum amount of injection. When the amount of fuel injected exceeds about 50 percent of the maximum amount of injection, the density of the fuel particles is high even if the fuel particles are dispersed, so NOx and soot are produced.

Therefore, when the amount of fuel injected is less than about 50 percent of the maximum amount of injection, smooth combustion without generation of NOx and soot can be obtained if the fuel is injected in the injection timing region III.

As shown in FIGS. 2A, 2B, 3A, and 3B, the latest injection timing of the injection timing region III, that is, in FIGS. 2A, 2B, and 3A, the boundary Y between the injection timing region III and the injection timing region II and, in FIG. 3B, the boundary XY between the injection timing period III and the injection timing period I, is substantially the same regardless of the amount of injection. That is, the boundaries Y and XY are near 50 degrees BTDC when the engine speed N is 600 rpm. The higher the engine speed N becomes, the more they shift to bottom dead center of the compression stroke. When the engine speed N is 4000 rpm, they become about 90 degrees BTDC. That is, it takes time for the injected fuel to disperse, therefore to get the injected fuel to disperse, that is, to make the density of the fuel particles low, it is necessary to make the injection timing earlier the higher the engine speed N. Further, the higher the engine speed N, the shorter the time for heating the fuel particles, therefore in order to give the fuel particles sufficient heat required for the fuel particles to ignite, it is necessary to make the injection timing earlier the higher the engine speed N. Therefore, as shown in FIGS. 2A, 2B, 3A, and 3B, the boundaries X and XY shift toward the bottom dead center of the compression stroke as the engine speed N rises.

Note that the boundaries X and XY do not in practice appear as clearly as shown in FIGS. 2A, 2B, 3A, and 3B, therefore the boundaries X and XY express the approximate timings of the latest injection timing in the injection timing region III.

Next, an explanation will be given of the injection timing region II. As explained earlier, no combustion occurs if fuel of less than about 30 percent of the maximum amount of injection is injected in the injection timing region II.

That is, as explained above, before about 30 degrees BTDC, the temperature in the combustion chamber 5 is less than 700° K., therefore if fuel is injected in the injection timing region II, no chemical reaction occurs. Further, since the pressure P in the combustion chamber 5 is higher in the injection timing region II than the injection timing region III, the degree of dispersion of the fuel particles is lower than in the injection timing region III. Since the amount of fuel injected is less than 30 percent of the maximum amount of injection, however, the density of the fuel particles is relatively small even if the degree of dispersion of the fuel particles falls somewhat. If the density of the fuel particles is low in this way, the space between fuel particles becomes greater and therefore, as explained above, the fuel particles do not receive much of the heat of oxidation of the evaporated fuel of the surrounding fuel particles and so do not break down under heat. Therefore, no explosive combustion occurs.

On the other hand, as mentioned above, if the evaporated fuel of the fuel particles undergoes an oxidation reaction, hydroxy groups are produced at the terminals of the straight chain hydrocarbons. When the piston 4 next rises, the amount of the straight chain hydrocarbons with hydroxy groups, that is, the amount of oxygen-containing easily burnable hydrocarbons, increases. The injection timing region II is however later in injection timing than the injection timing region III, therefore the temperature of the fuel particles injected in the injection timing region II does not rise to the extent of ignition. Therefore, combustion does not start even if the amount of oxygen-containing easily burnable hydrocarbons increases.

Next, the top dead center of the compression stroke is reached in this state, that is, in the state with an increase in the amount of oxygen-containing easily burnable hydrocarbons without combustion. If nothing is then done, the fuel will not ignite resulting in a misfire.

As shown in FIGS. 2A, 2B, and 3A, the latest injection timing in the injection timing region II, that is, the boundary X between the injection timing region II and the injection timing region I, is substantially parallel to the boundary Y. That is, the width of the injection timing region II, in other words, the width between the boundary X and the boundary Y, becomes substantially constant regardless of the engine speed N. Further, as shown in FIGS. 2A, 2B, and 3A, the width between the boundary X and the boundary Y becomes smaller the larger the ratio of the amount of injection to the maximum amount of injection. As shown in FIG. 3B, when the amount of injection becomes more than 30 percent of the maximum amount of injection, the injection timing region II disappears.

That is, when the amount of injection is 5 percent of the maximum amount of injection, as shown in FIG. 2A, the boundary X when the engine speed N is 600 rpm is about 20 degrees BTDC and the width between the boundary X and the boundary Y increases from about 30 degrees crank angle to about 40 degrees crank angle. When the amount of injection is 10 percent of the maximum amount of injection, as shown in FIG. 2B, the boundary X when the engine speed N is 600 rpm is about 30 degrees BTDC and the width between the boundary X and the boundary Y increases from about 20 degrees crank angle to about 30 degrees crank angle. When the amount of injection is 20 percent of the maximum amount of injection, as shown in FIG. 3A, the boundary X when the engine speed N is 600 rpm is about 40 degrees BTDC and the width between the boundary X and the boundary Y increases from about 10 degrees crank angle to about 15 degrees crank angle. When the amount of injection is over 30 percent of the maximum amount of injection, as shown in FIG. 3B, the injection timing region II disappears.

If the amount of fuel injection is increased, the density of the fuel particles becomes greater, therefore when the amount of fuel injection is increased, the degree of dispersion of the fuel particles has to be increased or else combustion will occur. The degree of dispersion of fuel particles becomes higher the earlier the injection timing, therefore the width of the injection timing region II becomes smaller the larger the amount of injection.

Further, the injection timing region II shifts to the low load side the higher the engine speed N. That is, as explained above, it takes time for the injected fuel to disperse. If the injection timing is not made earlier the higher the engine speed N, the degree of dispersion of the fuel particles will not become smaller. Therefore, the injection timing region II shifts to the low load side the higher the engine speed N. Note that the boundary X is expressed clearer than the boundaries Y and XY.

On the other hand, if fuel is injected in the injection timing region I, normal combustion as in the past occurs. That is, in the injection timing region I, since the pressure P in the combustion chamber 5 (FIG. 4) is high and therefore the injected fuel does not sufficiently disperse, the density of the fuel particles becomes higher. As a result, the fuel particles break down by the heat causing explosive combustion and the generation of large amounts of NOx and soot.

As explained above, when the amount of fuel injection is less than 30 percent of the maximum amount of injection, no combustion will occur when fuel is injected in the injection timing region II. As opposed to this, when the amount of fuel injection becomes more than 30 percent of the maximum amount of injection, the injected fuel will burn no matter what the injection timing region. In this case, as shown in FIG. 3B, there are only the injection timing regions I and III.

If the injected fuel is made to disperse in this way, when the amount of fuel injection is less than 30 percent of the maximum amount of injection, the injection timing region can be divided into the injection timing region I where explosive combustion occurs, the injection timing region III where smooth combustion occurs without the generation of NOx and soot, and the injection timing region II where no combustion occurs between the injection timing regions I and III. On the other hand, when the amount of fuel injection is over 30 percent of the maximum amount of injection and less than about 50 percent, the injection timing region can be divided into the injection timing region I and the injection timing region III. When the amount of fuel injection is more than about 50 percent, normal combustion occurs as in the past over the entire injection timing region.

Note that the injection timing region II shown in FIGS. 2A, 2B, and 3A is affected by the compression ratio and the EGR rate (=amount of EGR gas/(amount of intake air+ amount of EGR gas)). That is, when the engine compression ratio becomes higher, in the injection timing region II shown in FIGS. 2A, 2B, and 3A, the pressure in the combustion chamber 5 becomes higher, so the fuel particles become harder to disperse and the temperature of the gas in the combustion chamber 5 also rises. Accordingly, if fuel is injected in the injection timing region II shown in FIGS. 2A, 2B, and 3A, the fuel particles break down due to the heat and therefore ignite. Therefore, if the engine compression ratio rises, the injection timing region II where no combustion occurs disappears.

On the other hand, if the EGR rate is made larger, the density of the oxygen around the fuel particles becomes smaller and as a result the heat of oxidation of the evaporated fuel from the fuel particles becomes lower, so even if the degree of dispersion of the fuel particles becomes smaller to a certain extent, the fuel particles no longer breaks down by the heat. Therefore, there is an injection timing region II where no combustion will occur even when the engine compression ratio is made a bit higher when the EGR rate is high.

Figure 5:
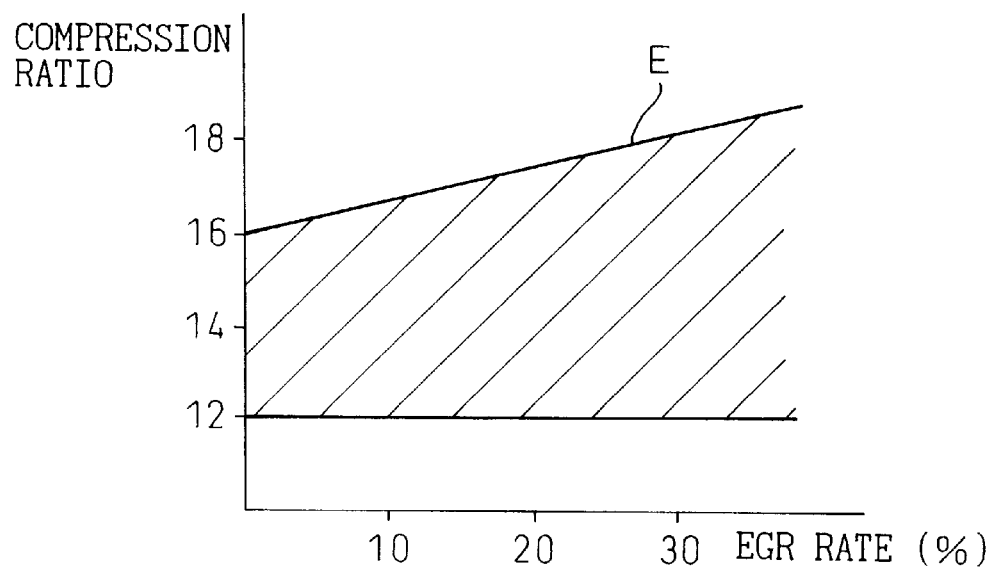
FIG. 5 is a view of the range of the compression ratio of an engine.

The solid line E in FIG. 5 shows the upper limit of the engine compression ratio in the injection timing region II where no combustion occurs as shown in FIGS. 2A, 2B, and 3A. As shown in FIG. 5, when the EGR rate is zero, the upper limit E of the engine compression ratio in the injection timing region II where no combustion occurs is about 16.0. If the engine compression ratio becomes larger than about 16.0, there is no longer an injection timing region II where no combustion occurs.

On the other hand, the upper limit E of the engine compression ratio in the injection timing region II where no combustion occurs becomes higher the higher the EGR rate. Further, to cause compression ignition, the engine compression ratio must be made at least about 12.0. Therefore, the range of engine compression ratio in the injection timing region II where no combustion occurs becomes the range shown by the hatching in FIG. 5.

As explained earlier, if fuel is injected in an amount of less than 30 percent of the maximum amount of injection in the injection timing region II, a considerable amount of oxygen-containing easily burnable hydrocarbons are produced in the combustion chamber near top dead center of the compression stroke. No combustion occurs at this time, therefore if fuel is again injected at this time, the fuel particles are dispersed in the combustion chamber 5 without burning. When the temperature rises, the fuel particles break down by heat at all locations. When the fuel particles break down by heat, the hydrogen molecules $H_2$ produced burn and as a result the pressure in the combustion chamber 5 as a whole rises, so the temperature in the combustion chamber 5 as a whole rises.

When the temperature in the combustion chamber 5 as a whole rises, the oxygen-containing easily burnable hydrocarbons dispersed in the combustion chamber 5 as a whole simultaneously start to burn, whereby the fuel particles injected the second time can be burned. If combustion is started simultaneously throughout the combustion chamber 5 in this way, there is no local rise in the combustion temperature and the combustion temperature in the combustion chamber 5 becomes lower as a whole, so generation of NOx is suppressed. Further, since the fuel injected the second time can be burned after being dispersed, there is sufficient air present around the fuel particles and therefore the generation of soot is also suppressed.

Therefore, in the present invention, the first fuel injection of not more than 30 percent of the maximum amount of injection is performed in the injection timing region II, then the second fuel injection is performed at substantially the top dead center of the compression stroke or after top dead center of the compression stroke.

Note that in the past, compression-ignition type engines have been designed to inject a small amount of fuel before the main injection, that is, perform a pilot injection. This pilot injection is usually performed in the injection timing region I shown in FIGS. 2A, 2B, and 3A. Therefore, the pilot fuel injected ignites on its own. As opposed to this, in the present invention, the fuel injected in the injection timing region II does not ignite on its own. Accordingly, the injection action in the injection timing region II and the conventional pilot injection action can be clearly differentiated from other each.

Figure 6A:
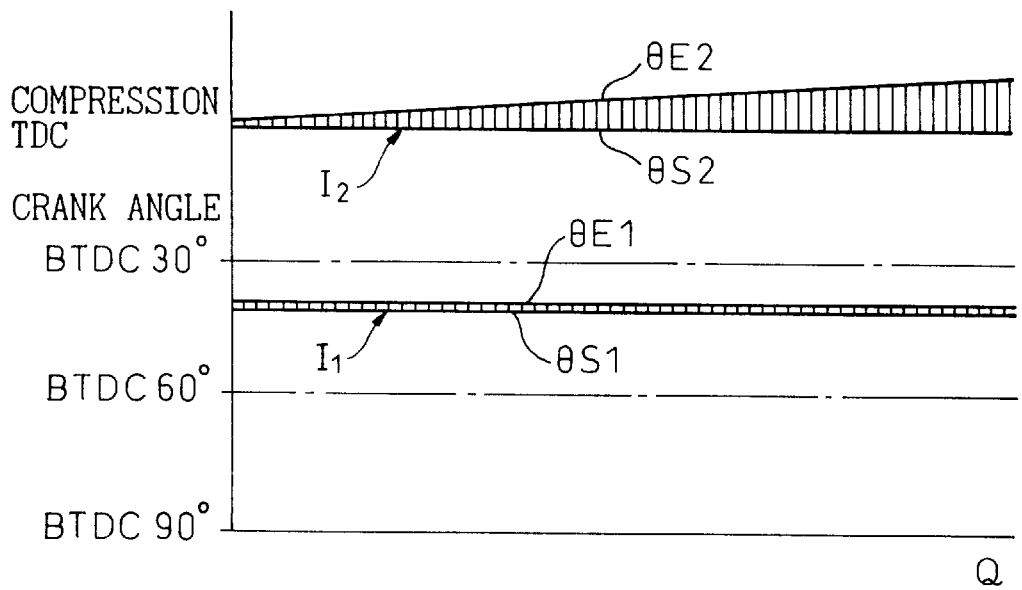
FIGS. 6A and 6B are views of the injection timing.
Figure 6B:
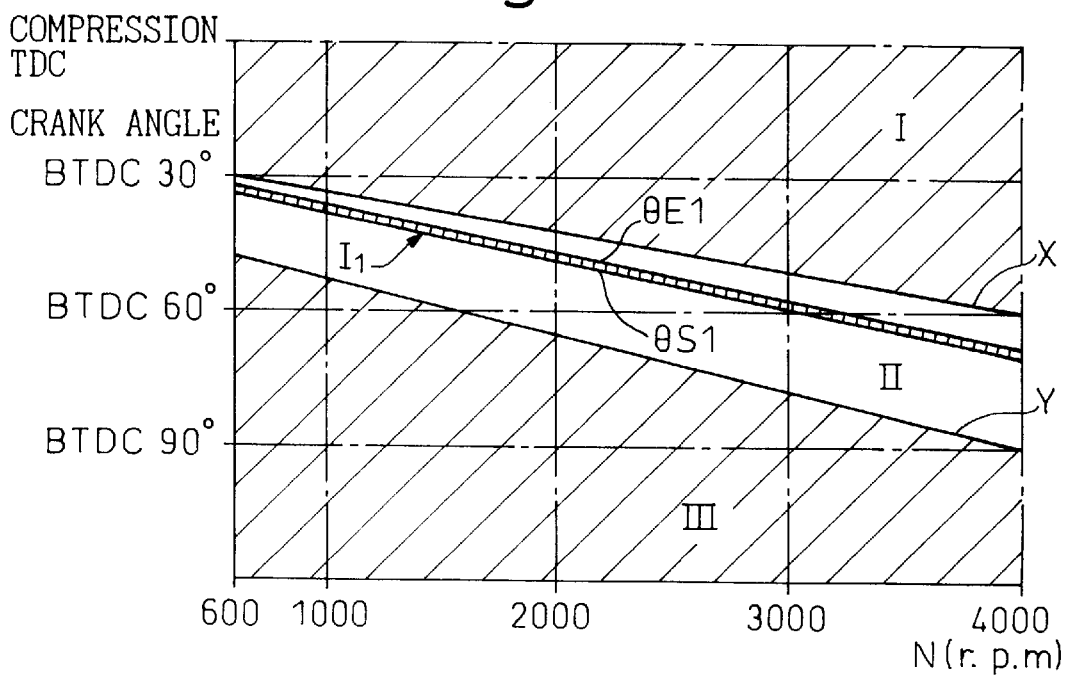

FIG. 6B shows the injection timing of the first fuel injection $I_1$, while FIG. 6A shows the injection timing of the first fuel injection $I_1$ and the second fuel injection $I_2$ at a specific engine speed N, for example, 1500 rpm. Note that the abscissa of FIG. 6A shows the total amount of fuel injection Q, while the ordinate N of FIG. 6B shows the engine speed.

Further, in FIGS. 6A and 6B, $\theta S1$ and $\theta E1$ show the injection start timing and the injection end timing of the first fuel injection $I_1$, while $\theta S2$ and $\theta E2$ show the injection start timing and injection end timing of the second fuel injection $I_2$. Further, FIGS. 6A and 6B show the case where the fuel pressure in the common rail 22 is maintained at a certain constant pressure. Therefore, in FIGS. 6A and 6B, the amount of fuel injection is proportional to the injection timing.

As shown in FIG. 6B, the first fuel injection $I_1$ is performed at a timing close to the relative boundary X in the injection timing region II, therefore the timing of the first fuel injection $I_1$ is made earlier the higher the engine speed N. Note that in the embodiment shown in FIGS. 6A and 6B, the amount of injection of the first fuel injection $I_1$ is made 10 percent of the maximum amount of injection. Further, in the embodiment shown in FIGS. 6A and 6B, the injection start timing $\theta S2$ of the second fuel injection $I_2$ is fixed to the top dead center of the compression stroke (TDC).

In FIG. 6A, the total amount of fuel injection Q is a function of the amount of depression L of the accelerator pedal 40 and the engine speed N. The total amount of fuel injection Q is stored in advance in the ROM 32 in the form of the map shown in FIG. 7A. On the other hand, the injection amount Q1 of the first fuel injection $I_1$ is a function of the total amount of fuel injection Q and the engine speed N. The injection amount Q1 is also stored in advance in the ROM 32 in the form of the map shown in FIG. 7B. Further, the injection start timing $\theta S1$ of the first fuel injection $I_1$ is also a function of the total amount of fuel injection Q and the engine speed N. The injection start timing $\theta S1$ is also stored in advance in the ROM 32 in the form of the map shown in FIG. 7C.

FIG. 8 shows the injection control routine. Referring to FIG. 8, first, at step 50, the total amount of fuel injection Q is calculated from the map shown in FIG. 7A. Next, at step 51, the injection amount Q1 of the first fuel injection $I_1$ is calculated from the map shown in FIG. 7B. Next, at step 52, the injection start timing $\theta S1$ of the first fuel injection $I_1$ is calculated from the map shown in FIG. 7C. Next, at step 53, the injection end timing $\theta E1$ of the first fuel injection $I_1$ is calculated based on the injection amount Q1 and the injection start timing $\theta S1$. Next, at step 54, the injection end timing $\theta E2$ of the second fuel injection $I_2$ is calculated based on the total amount of fuel injection Q and the fuel injection Q1 etc.

According to the present invention, as mentioned above, it is possible to suppress the generation of NOx and soot over the entire operating region of the engine.

While the invention has been described with reference to specific embodiments chosen for purposes of illustration, it should be apparent that numerous modifications could be made thereto by those skilled in the art without departing from the basic concept and scope of the invention.

I claim:

1. A compression-ignition type engine comprising:
   a combustion chamber;
   a fuel injector injecting fuel toward the inside of the combustion chamber; and
   injection control means for injecting an amount of first fuel by which amount combustion does not occur even if injected, in a predetermined injection timing region of a latter half of a compression stroke where combustion does not occur even if injected, and causing injection of second fuel at a timing later than the predetermined injection timing region to cause combustion of the first fuel and the second fuel,
   wherein the amount of the first fuel where combustion does not occur even with injection is not more than 30 percent of the maximum amount of injection.

2. A compression-ignition type engine as set forth in claim 1, wherein said predetermined injection timing region is from about 90 degrees before top dead center of the compression stroke to about 20 degrees before top dead center of the compression stroke.

3. A compression-ignition type engine as set forth in claim 2, wherein the earliest injection timing in the predetermined injection timing region shifts toward the bottom dead center of the compression stroke the higher the engine speed and the latest injection timing in the predetermined injection timing region shifts toward the bottom dead center of the compression stroke the higher the engine speed.

4. A compression-ignition type engine as set forth in claim 3, wherein the earliest injection timing is near 50 degrees before top dead center of the compression stroke when the engine speed is 600 rpm and near 90 degrees before top dead center of the compression stroke when the engine speed is 4000 rpm.

5. A compression-ignition type engine as set forth in claim 3, wherein the latest injection timing shifts toward the bottom dead center of the compression stroke the larger the ratio of the amount of the first fuel injection to the maximum amount of injection and the difference between the earliest injection timing and the latest injection timing at the same engine speed becomes smaller the larger the ratio.

6. A compression-ignition type engine as set forth in claim 5, wherein when the amount of the first fuel injection is 5 percent of the maximum amount of injection and the engine speed is 600 rpm, the latest injection timing is about 20 degrees before top dead center of the compression stroke and the difference in injection timings is from about 30 degrees crank angle to 40 degrees crank angle.

7. A compression-ignition type engine as set forth in claim 5, wherein when the amount of the first fuel injection is 10 percent of the maximum amount of injection and the engine speed is 600 rpm, the latest injection timing is about 30 degrees before top dead center of the compression stroke and the difference in injection timings is from about 20 degrees crank angle to 30 degrees crank angle.

8. A compression-ignition type engine as set forth in claim 5, wherein when the amount of the first fuel injection is 20 percent of the maximum amount of injection and the engine speed is 600 rpm, the latest injection timing is about 40 degrees before top dead center of the compression stroke and the difference in injection timings is from about 10 degrees crank angle to 15 degrees crank angle.

9. A compression-ignition type engine as set forth in claim 1, wherein the first fuel injection timing is made earlier the higher the engine speed.

10. A compression-ignition type engine as set forth in claim 1, wherein the second fuel injection is performed at substantially top dead center of the compression stroke or after top dead center of the compression stroke.

11. A compression-ignition type engine comprising:
    a combustion chamber;
    a fuel injector injecting fuel toward the inside of the combustion chamber; and
    injection control means for injecting an amount of first fuel by which amount combustion does not occur even if injected, in a predetermined injection timing region of a latter half of a compression stroke where combustion does not occur even if injected, and causing injection of second fuel at a timing later than the predetermined injection timing region to cause combustion of the first fuel and the second fuel,
    wherein said predetermined injection timing region is from about 90 degrees before top dead center of the compression stroke to about 20 degrees before top dead center of the compression stroke.

12. A compression-ignition type engine as set forth in claim 11, wherein the earliest injection timing in the predetermined injection timing region shifts toward the bottom dead center of the compression stroke the higher the engine speed and the latest injection timing in the predetermined injection timing region shifts toward the bottom dead center of the compression stroke the higher the engine speed.

13. A compression-ignition type engine as set forth in claim 12, wherein the earliest injection timing is near 50 degrees before top dead center of the compression stroke when the engine speed is 600 rpm and near 90 degrees before top dead center of the compression stroke when the engine speed is 4000 rpm.

14. A compression-ignition type engine as set forth in claim 12, wherein the latest injection timing shifts toward the bottom dead center of the compression stroke the larger the ratio of the amount of the first fuel injection to the maximum amount of injection and the difference between the earliest injection timing and the latest injection timing at the same engine speed becomes smaller the larger the ratio.

15. A compression-ignition type engine as set forth in claim 14, wherein when the amount of the first fuel injection is 5 percent of the maximum amount of injection and the engine speed is 600 rpm, the latest injection timing is about 20 degrees before top dead center of the compression stroke and the difference in injection timings is from about 30 degrees crank angle to 40 degrees crank angle.

16. A compression-ignition type engine as set forth in claim 14, wherein when the amount of the first fuel injection is 10 percent of the maximum amount of injection and the engine speed is 600 rpm, the latest injection timing is about 30 degrees before top dead center of the compression stroke and the difference in injection timings is from about 20 degrees crank angle to 30 degrees crank angle.

17. A compression-ignition type engine as set forth in claim 14, wherein when the amount of the first fuel injection is 20 percent of the maximum amount of injection and the engine speed is 600 rpm, the latest injection timing is about 40 degrees before top dead center of the compression stroke and the difference in injection timings is from about 10 degrees crank angle to 15 degrees crank angle.

18. A compression-ignition type engine comprising:

a combustion chamber;

a fuel injector injecting fuel toward the inside of the combustion chamber; and injection control means for injecting an amount of first fuel by which amount combustion does not occur even if injected, in a predetermined injection timing region of a latter half of a compression stroke where combustion does not occur even if injected, and causing injection of second fuel at a timing later than the predetermined injection timing region to cause combustion of the first fuel and the second fuel, wherein the first fuel injection timing is made earlier the higher the engine speed.

* * * * *